United States Patent
Kato et al.

(10) Patent No.: US 11,092,992 B2
(45) Date of Patent: Aug. 17, 2021

(54) VEHICLE PEDAL DEVICE

(71) Applicant: TOYOTA JIDOSHA KABUSHIKI KAISHA, Toyota (JP)

(72) Inventors: Hideyuki Kato, Okazaki (JP); Osamu Kinoshita, Okazaki (JP); Genta Yamaguchi, Toyota (JP); Yasuo Adachi, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/774,819

(22) Filed: Jan. 28, 2020

(65) Prior Publication Data

US 2020/0264650 A1    Aug. 20, 2020

(30) Foreign Application Priority Data

Feb. 19, 2019    (JP) .............................. JP2019-027631

(51) Int. Cl.
   *B60K 26/02*    (2006.01)
   *B60T 7/06*     (2006.01)
   *G05G 1/44*     (2008.04)
   *G05G 1/327*    (2008.04)

(52) U.S. Cl.
   CPC ............. *G05G 1/327* (2013.01); *B60K 26/02* (2013.01); *B60T 7/065* (2013.01); *G05G 1/44* (2013.01)

(58) Field of Classification Search
   CPC . G05G 1/32; G05G 1/327; G05G 1/44; B62K 26/02; B60T 7/065; B60R 21/09; B60K 23/02
   See application file for complete search history.

(56) References Cited

U.S. PATENT DOCUMENTS

| | | | | |
|---|---|---|---|---|
| 5,615,749 A | * | 4/1997 | Kato | ........................ B60R 21/09 |
| | | | | 180/274 |
| 6,327,930 B1 | * | 12/2001 | Ono | ........................ B60R 21/09 |
| | | | | 188/377 |
| 10,082,821 B1 | * | 9/2018 | Kim | ........................ B60T 7/065 |

(Continued)

FOREIGN PATENT DOCUMENTS

| | | |
|---|---|---|
| DE | 10 2005 042 281 A1 | 3/2007 |
| DE | 10 2007 063 885 B3 | 3/2016 |

(Continued)

OTHER PUBLICATIONS

KR 2006030267, Kwon, Device for Preventing a Brake Pedal from Being Pushed by Breaking a Predetermined Part of the Brake Pedal in an Accident, Oct. 4, 2006. (Year: 2006).*

(Continued)

*Primary Examiner* — Vinh Luong
(74) *Attorney, Agent, or Firm* — Sughrue Mion, PLLC (57) ABSTRACT

A vehicle pedal device includes: a pedal; a pedal bracket that supports the pedal such that the pedal pivots; and a guide member that guides deformation of the pedal bracket when a load is applied from a front of a vehicle. The guide member is attached to an instrument panel reinforcement. The guide member has a tilted surface tilted downward toward a rear of the vehicle. The pedal bracket is attached to a dash panel. The pedal bracket has a guided portion that is guided by the tilted surface when the load is applied from the front of the vehicle. The guided portion has a brittle portion.

7 Claims, 6 Drawing Sheets

(56) References Cited

U.S. PATENT DOCUMENTS

| | | | |
|---|---|---|---|
| 2002/0043125 A1* | 4/2002 | Oono | B60T 7/065 |
| | | | 74/512 |
| 2002/0184962 A1* | 12/2002 | Saitou | B60T 7/065 |
| | | | 74/512 |
| 2006/0102412 A1 | 5/2006 | Morishita et al. | |
| 2010/0089198 A1* | 4/2010 | Fujioka | G05G 1/323 |
| | | | 74/594.4 |
| 2014/0260766 A1* | 9/2014 | Sukonthapanich | B60R 21/09 |
| | | | 74/512 |
| 2016/0244033 A1* | 8/2016 | Uchida | G05G 1/30 |
| 2016/0273630 A1* | 9/2016 | Ogawa | G05G 5/05 |
| 2017/0050625 A1 | 2/2017 | Kawazu | |

FOREIGN PATENT DOCUMENTS

| | | |
|---|---|---|
| EP | 0803420 A2 * | 10/1997 |
| JP | 2006-142940 A | 6/2006 |
| JP | 2016-103228 A | 6/2016 |
| JP | 2017-041102 A | 2/2017 |
| KR | 100610113 B1 * | 8/2006 |
| WO | WO 2010116092 A1 * | 10/2010 |

OTHER PUBLICATIONS

L.R. Cornwell, Mechanical Properties of Brittle Material, Dept. of Mechanical Engineering, Texas A&M University, College Station, Texas 77843-3123, Mar. 27, 2020 (Year: 2020).*
Define brittle—Google Search, Mar. 27, 2020 (Year: 2020).*
Brittleness—Wikipedia, Mar. 27, 2020 (Year: 2020).*
Define recessed, Cambridge Dictionary, Jan. 29, 2021 (Year: 2021).*
Define cutout, Cambridge Dictionary, Jan. 29, 2021 (Year: 2021).*
EPO Machine Translation of WO2010116092 (A1), Blais et al., Oct. 14, 2010 (Year: 2010).*

* cited by examiner

VEHICLE PEDAL DEVICE

INCORPORATION BY REFERENCE

The disclosure of Japanese Patent Application No. 2019-027631 filed on Feb. 19, 2019 including the specification, drawings and abstract is incorporated herein by reference in its entirety.

BACKGROUND

1. Technical Field

The disclosure relates to vehicle pedal devices.

2. Description of Related Art

Brake pedal devices mounted on vehicles are known in the art (see, e.g., Japanese Unexamined Patent Application Publication No. 2017-41102 (JP 2017-41102 A)).

A brake pedal device described in JP 2017-41102 A includes a brake pedal that is operated by a driver, a pedal bracket that supports the brake pedal so that the brake pedal is pivotable, and a guide member that guides deformation of the pedal bracket in case of a vehicle collision such as a frontal collision. The pedal bracket is attached to a dash panel, and the guide member is attached to an instrument panel reinforcement. The dash panel is configured to separate an engine compartment from a cabin. The instrument panel reinforcement extends in the lateral direction of a vehicle and is disposed behind the dash panel in the longitudinal direction of the vehicle.

The guide member has a tilted surface tilted downward toward the rear of the vehicle. The pedal bracket has a guided portion on the rear side thereof in the longitudinal direction of the vehicle. The guided portion is guided by the tilted surface of the guide member in case of a vehicle collision. The pedal bracket has a fixed portion on the front side thereof in the longitudinal direction of the vehicle. The fixed portion is fixed to the dash panel. A center of deformation, namely the center about which the pedal bracket is deformed in case of a vehicle collision, is set near the fixed portion. Accordingly, when the dash panel is moved toward the rear of the vehicle with respect to the instrument panel reinforcement in case of a vehicle collision, the guided portion is guided by the tilted surface and the pedal bracket is pivoted downward about the center of deformation. The brake pedal is thus restrained from moving toward the rear of the vehicle.

SUMMARY

In the above brake pedal device, however, when an excessive load is applied to the contact portion between the guided portion and the tilted surface while the guided portion is being guided by the tilted surface in case of a vehicle collision, the guided portion bites into the tilted surface and is caught by the tilted surface. When the guided portion is caught by the tilted surface, the guided portion cannot be appropriately guided along the tilted surface, and the brake pedal is therefore less restrained from moving toward the rear of the vehicle.

The disclosure provides a vehicle pedal device that can restrain a guided portion from being caught by a tilted surface in case of a vehicle collision.

A first aspect of the disclosure relates to a vehicle pedal device. The vehicle pedal device includes: a pedal; a pedal bracket that supports the pedal such that the pedal pivots; and a guide member that guides deformation of the pedal bracket when a load is applied from a front of a vehicle. The guide member is attached to an instrument panel reinforcement. The guide member has a tilted surface tilted downward toward a rear of the vehicle. The pedal bracket is attached to a dash panel. The pedal bracket has a guided portion that is guided by the tilted surface when the load is applied from the front of the vehicle. The guided portion has a brittle portion.

With this configuration, when the guided portion is guided by the tilted surface in case of a vehicle collision, the brittle portion is deformed before an excessive load is applied to the contact portion between the guided portion and the tilted surface. The guided portion is thus restrained from biting into the tilted surface.

In the vehicle pedal device of the first aspect, the guided portion may include: a main surface; a side surface extending downward from an end of the main surface in a lateral direction of the vehicle; and a rear end face extending downward from a rear end of the main surface in a longitudinal direction of the vehicle.

With this configuration, the rear end face of the guided portion is allowed to slide along the tilted surface in case of a vehicle collision.

In the vehicle pedal device of the first aspect, the brittle portion may include a cutout portion formed in the side surface, and the side surface may be recessed upward by the cutout portion as viewed in the lateral direction of the vehicle.

This configuration facilitates downward deformation of a rear end of the guided portion.

In the vehicle pedal device of the first aspect, the brittle portion may include a recess formed in the side surface, and the side surface may be recessed inward in the lateral direction of the vehicle by the recess as viewed from above.

This configuration facilitates deformation of the rear end of the guided portion in the lateral direction of the vehicle.

In the vehicle pedal device of the first aspect, the brittle portion may include a through hole formed in the main surface.

This configuration makes it easy to form the brittle portion.

In the vehicle pedal device of the first aspect, the guide member may have a side wall formed along an end of the tilted surface in the lateral direction of the vehicle.

This configuration restrains the rear end of the guided portion from being displaced in the lateral direction of the vehicle with respect to the tilted surface.

The vehicle pedal device of the first aspect may further include: a lever bracket attached to the dash panel; a lever provided in the lever bracket such that the lever pivots; and a fastening member that fastens the lever bracket and the pedal bracket together. The lever may be configured so that, when the load is applied from the front of the vehicle, the lever contacts the guide member and is pivoted to unfasten the lever bracket and the pedal bracket fastened together by the fastening member from each other.

This configuration simplifies assembly as the pedal bracket and the lever bracket are not fixed to the guide member.

The vehicle pedal device of the disclosure restrains the guided portion from being caught by the tilted surface in case of a vehicle collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described with reference to the accompanying drawings. The embodiment will be described with respect to the case where the disclosure is applied to a brake pedal device mounted on a vehicle.

First, a brake pedal device 100 according to the embodiment will be described with reference to FIGS. 1 to 4.

Figure 1:
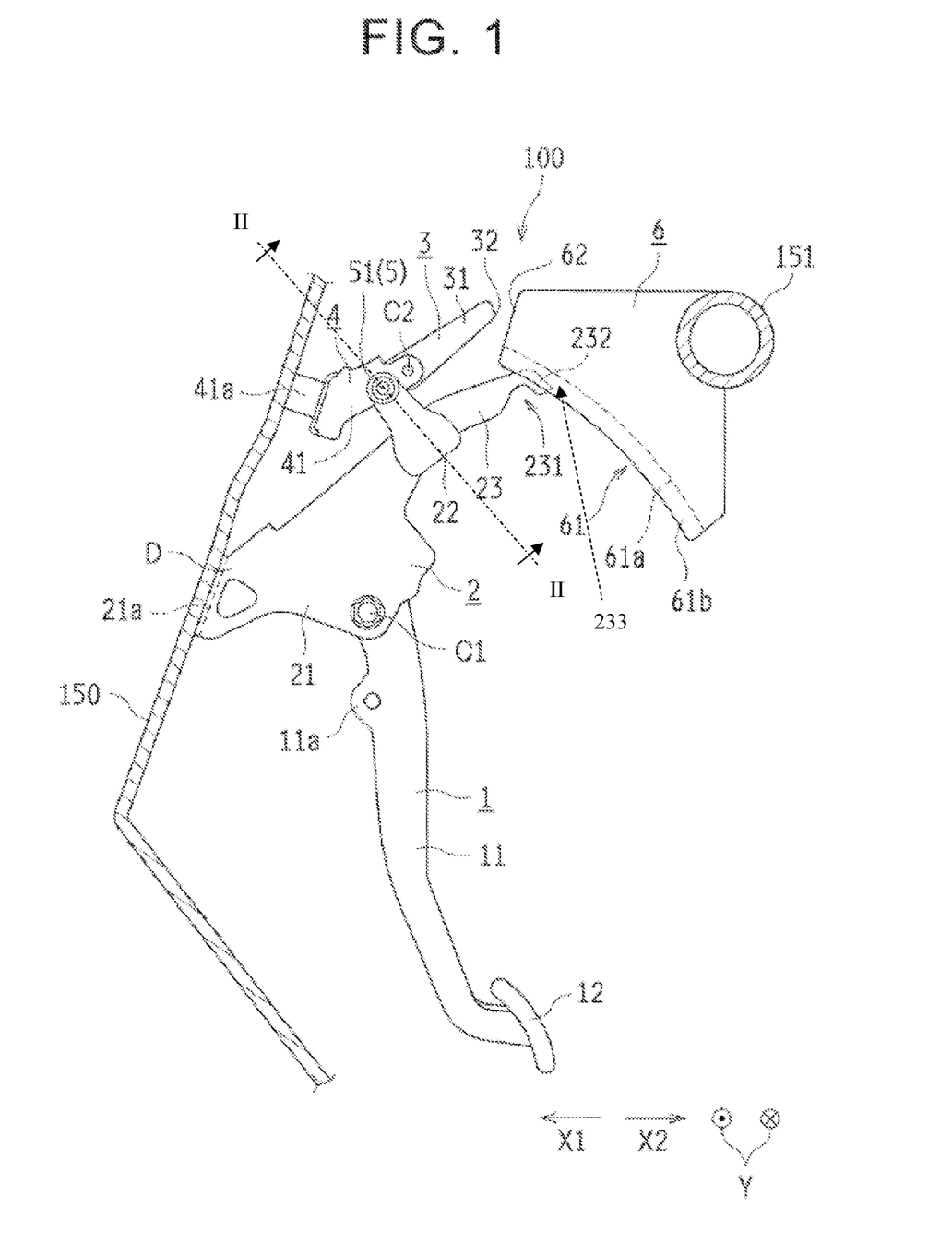
FIG. 1 is a side view illustrating a general configuration of a brake pedal device according to an embodiment.

As shown in FIG. 1, the brake pedal device 100 is disposed in the foot space of the driver's seat of a vehicle. The brake pedal device 100 is provided to operate a brake device (not shown) of the vehicle. The brake pedal device 100 is configured to restrain movement of a brake pedal 1 toward the rear of the vehicle (in the X2 direction) in case of a vehicle collision such as a frontal collision.

The vehicle provided with the brake pedal device 100 includes a dash panel 150 and an instrument panel reinforcement 151 as a part of a vehicle body frame. The dash panel 150 is configured to separate an engine compartment from a cabin. The engine compartment is disposed on the front side (the side in the X1 direction) of the dash panel 150 in the longitudinal direction of the vehicle, and the cabin is disposed on the rear side of the dash panel 150 in the longitudinal direction of the vehicle. The instrument panel reinforcement 151 extends in the lateral direction of the vehicle (Y direction), and an instrument panel (not shown) is attached to the instrument panel reinforcement 151. The instrument panel reinforcement 151 is disposed on the rear side of the dash panel 150 in the longitudinal direction of the vehicle.

The brake pedal device 100 includes a brake pedal 1, a pedal bracket 2, a lever 3, a lever bracket 4, a fastening member 5, and a guide member 6. The brake pedal device 100 is disposed between the dash panel 150 and the instrument panel reinforcement 151. The pedal bracket 2 and the lever bracket 4 are fixed to the dash panel 150, and the guide member 6 is fixed to the instrument panel reinforcement 151.

The brake pedal 1 is an operation member that is operated by a driver and is pivotably attached to the pedal bracket 2. The brake pedal 1 has an arm 11 and a pad 12 provided at the lower end of the arm 11. The arm 11 has a coupling portion 11a, and a rod (not shown) of a brake booster is coupled to the coupling portion 11a. The brake booster is fixed to the front side of the dash panel 150 in the longitudinal direction of the vehicle. A master cylinder is connected to the brake booster, and the brake device is connected to the master cylinder.

The brake pedal 1 is configured to be pivotable with respect to the pedal bracket 2 about a pivot center C1 located at the upper end of the arm 11. The brake pedal 1 is biased counterclockwise in FIG. 1 by a biasing member (not shown) and is positioned at a predetermined initial position by a stopper (not shown). When the brake pedal 1 is depressed by the driver, the brake pedal 1 is pivoted clockwise in FIG. 1 against the biasing force of the biasing member, so that the brake device is operated. The brake pedal 1 is an example of the "pedal" in the disclosure.

The pedal bracket 2 is configured to support the brake pedal 1 so that the brake pedal 1 is pivotable. The pedal bracket 2 includes a pair of right and left side plates 21, a pair of right and left side plates 22, and a guided portion 23. The side plates 21 face each other in the lateral direction of the vehicle, and the side plates 22 face each other in the lateral direction of the vehicle.

The pair of side plates 21 is a bracket body, and the arm 11 of the brake pedal 1 is pivotably attached between the side plates 21. Each side plate 21 has a fixed portion 21a at its front end in the longitudinal direction of the vehicle, and the fixed portion 21a is fixed to the dash panel 150. A center of deformation D, namely the center about which the pedal bracket 2 is deformed in case of a vehicle collision, is set near the fixed portion 21a.

Figure 2:
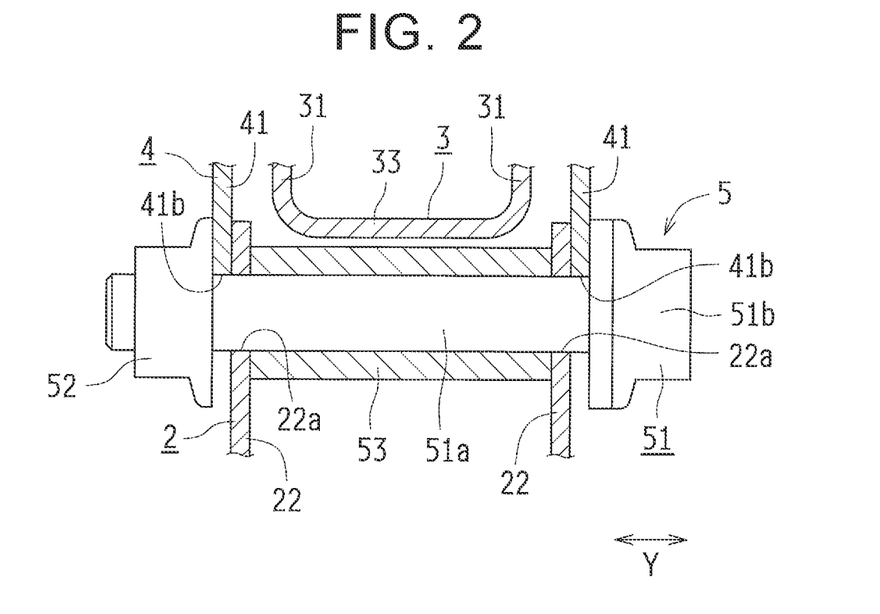
FIG. 2 is a sectional view illustrating a fastening member of the brake pedal device taken along line II-II shown in FIG. 1.

The side plates 22 are attached to the rear ends of the side plates 21 in the longitudinal direction of the vehicle. Each side plate 22 is configured to be fastened to the lever bracket 4 by the fastening member 5. Specifically, as shown in FIG. 2, each side plate 22 has in its upper end an insertion hole 22a through which a shaft 51a of a bolt 51 is inserted.

Figure 3:
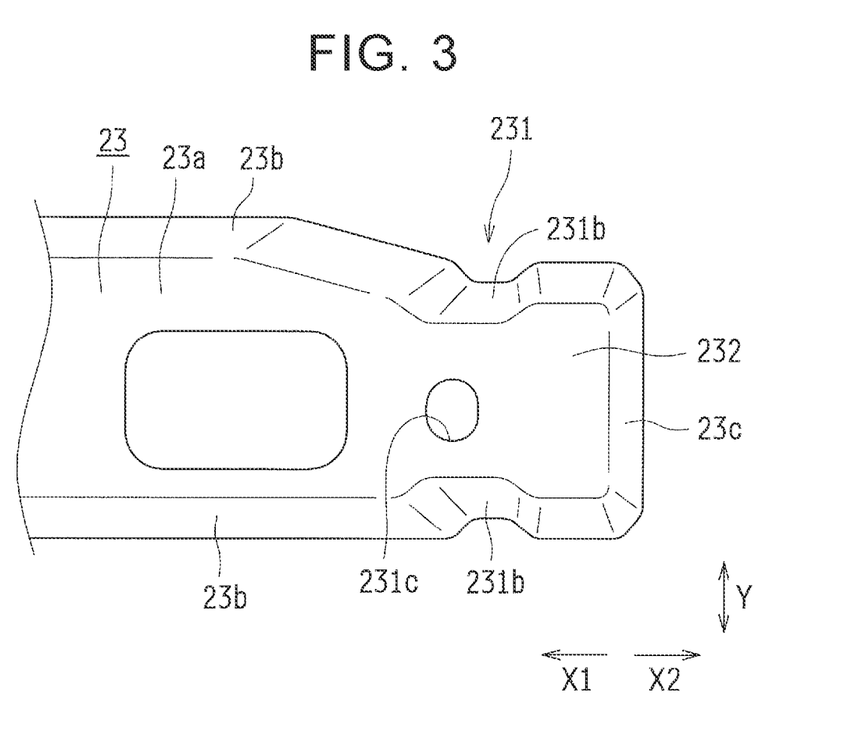
FIG. 3 is an enlarged plan view of a rear end side of a guided portion of the brake pedal device of FIG. 1.
Figure 4:
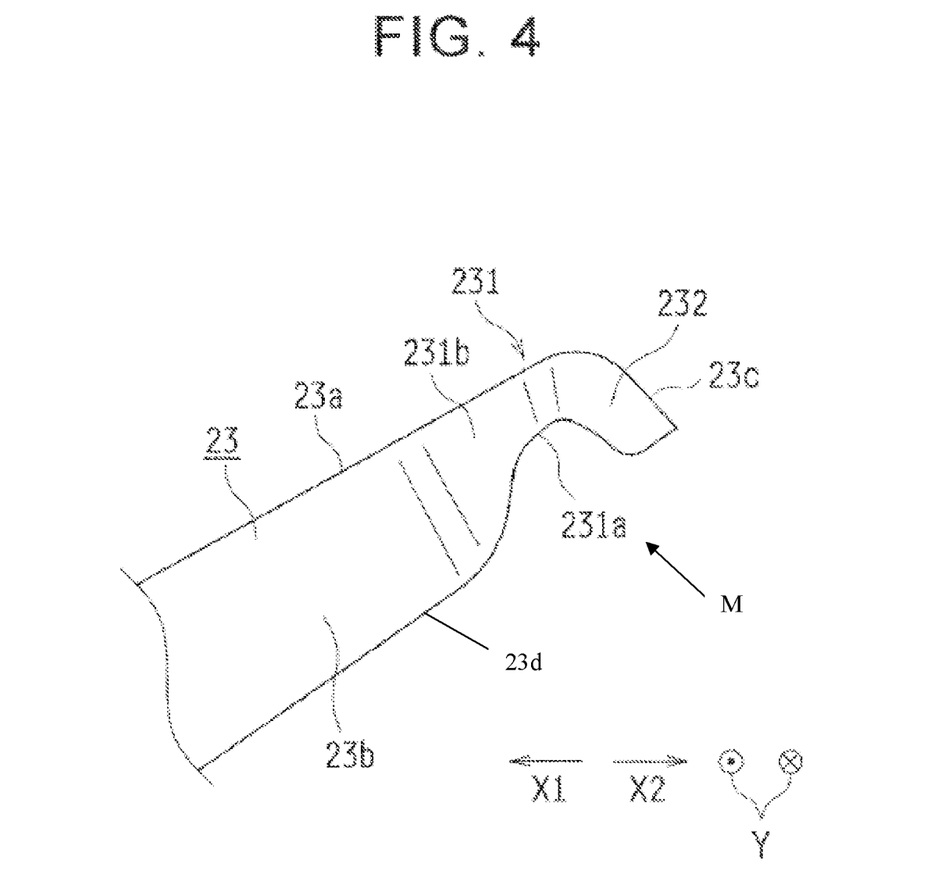
FIG. 4 is an enlarges side view of the rear end side of the guided portion of the brake pedal device of FIG. 1.

As shown in FIG. 1, the guided portion 23 is configured to be guided by a groove 61 of the guide member 6 in case of a vehicle collision. The guided portion 23 is attached between the pair of side plates 21 so as to extend from the side plates 21 toward the rear of the vehicle. As shown in FIGS. 3 and 4, the guided portion 23 is made of a plate material and includes a main surface portion (upper surface portion) 23a, a pair of side surface portions 23b extending downward from both ends of the main surface portion 23a in the lateral direction of the vehicle, and a rear end face 23c extending downward from the rear end of the main surface portion 23a in the longitudinal direction of the vehicle.

The main surface portion 23a has a rectangular shape as viewed in plan and is disposed so that the lateral direction of the main surface portion 23a matches the lateral direction of the vehicle. The main surface portion 23a is titled such that its rear end in the longitudinal direction of the vehicle is located higher than its front end in the longitudinal direction of the vehicle as viewed in the lateral direction of the vehicle. The side surface portions 23b face each other in the lateral direction of the vehicle. The rear end face 23c connects the rear ends of the pair of side surface portions 23b and closes the rear end of the U-shaped section formed by the main surface portion 23a and the pair of side surface portions 23b.

The guided portion 23 has a brittle portion 231 near its rear end. The brittle portion 231 is provided to facilitate deformation of the guided portion 23 in case of a vehicle collision. Specifically, the brittle portion 231 includes cutout portions 231a (see FIG. 4), recesses 231b, and a through hole 231c (see FIG. 3). As shown in FIG. 4, the cutout portion 231a is formed in each side surface portion 23b, and each side surface portion 23b is recessed upward (in a main surface side direction M) from an edge 23d by the cutout portion 231a as viewed in the lateral direction of the vehicle. The recess 231b is formed in each side surface portion 23b, and as shown in FIG. 3, each side surface portion 23b is recessed inward in the lateral direction of the vehicle by the recess 231b as viewed from above. The through hole 231c is formed in the main surface portion 23a and extends through the main surface portion 23a in the thickness direction of the main surface portion 23a. The cutout portions 231a, the recesses 231b, and the through hole 231c are located at the same position in the longitudinal direction of the guided portion 23. Accordingly, the recesses 231b (see FIG. 4) are located above the cutout portions 231a, and the through hole 231c is located in the region of the main surface portion 23a which is located between the pair of right and left recesses 231b (see FIG. 3).

As shown in FIG. 1, the lever 3 is pivotably provided in the lever bracket 4 so as to extend from the lever bracket 4 toward the rear of the vehicle. The lever 3 is provided to separate the pedal bracket 2 fastened to the lever bracket 4 from the lever bracket 4 in case of a vehicle collision. The lever 3 includes a pair of right and left side plates 31 facing each other in the lateral direction of the vehicle, and a contact portion 32 and a pushing portion 33 (see FIG. 2) which are provided between the pair of side plates 31. The side plates 31 are configured to be pivotable with respect to the lever bracket 4 about a pivot center C2. The contact portion 32 is located at the rear end of the lever 3 in the longitudinal direction of the vehicle. The pushing portion 33 is located at the front end of the lever 3 in the longitudinal direction of the vehicle and above the shaft 51a (see FIG. 2) of the bolt 51.

The lever 3 is biased clockwise in FIG. 1 by a biasing member (not shown) and is positioned at a predetermined initial position by a stopper (not shown). With the lever 3 being positioned at the predetermined initial position, the pushing portion 33 of the lever 3 is separated from a collar 53 (see FIG. 2) having the bolt 51 inserted therethrough. When the contact portion 32 contacts a contact surface 62 of the guide member 6 in case of a vehicle collision, the lever 3 is pivoted counterclockwise in FIG. 1 against the biasing force of the biasing member and the pushing portion 33 pushes down the collar 53, whereby the pedal bracket 2 is separated from the lever bracket 4.

The lever bracket 4 is disposed above the pedal bracket 2 and is configured to support the lever 3 so that the lever 3 is pivotable. The lever bracket 4 includes a pair of right and left side plates 41 facing each other in the lateral direction of the vehicle. The lever 3 is pivotably attached between the pair of side plates 41. Each side plate 41 has a fixed portion 41a at its front end in the longitudinal direction of the vehicle, and the fixed portion 41a is fixed to the dash panel 150. Each side plate 41 has a cutout portion 41b (see FIG. 6) in its lower end, and the shaft 51a of the bolt 51 is placed in the cutout portions 41b of the side plates 41.

The fastening member 5 is provided to fasten the pedal bracket 2 and the lever bracket 4 together. As shown in FIG. 2, the fastening member 5 has the bolt 51 and a nut 52. With the shaft 51a of the bolt 51 being inserted through the insertion holes 22a of the side plates 22 of the pedal bracket 2 and being placed in the cutout portions 41b of the side plates 41 of the lever bracket 4, the nut 52 is tightened on the shaft 51a of the bolt 51, whereby the pedal bracket 2 and the lever bracket 4 are fastened together. The collar 53 is disposed between the pair of side plates 22, and the shaft 51a of the bolt 51 is inserted through the collar 53. That is, the pairs of side plates 22, 41 and the collar 53 are sandwiched between a head 51b of the bolt 51 and the nut 52.

The guide member 6 is provided to guide deformation of the pedal bracket 2 in case of a vehicle collision. As shown in FIG. 1, the guide member 6 is attached to the instrument panel reinforcement 151 and has the groove 61 and the contact surface 62.

The groove 61 has a tilted surface 61a and side walls 61b and is configured to guide the guided portion 23 in case of a vehicle collision. The tilted surface 61a is the bottom surface of the groove 61 and is tilted downward toward the rear of the vehicle. That is, the tilted surface 61a is formed such that its rear end in the longitudinal direction of the vehicle is located below its front end in the longitudinal direction of the vehicle and such that the tilted surface 61a extends obliquely downward from its front end to its rear end. The side walls 61b are formed along both ends of the tilted surface 61a in the lateral direction of the vehicle so as to extend downward from the tilted surface 61a. That is, the groove 61 has a U-shape in section. For example, the depth of the groove 61 is set to approximately the same value as the distance between the rear end face 23c and the brittle portion 231 of the guided portion 23. The rear end 232 of the guided portion 23 is disposed in the upper end of the groove 61. The guided portion 23 and the groove 61 are separated from each other by space 233 in the state where a vehicle collision has not occurred.

The contact surface 62 is located above the groove 61 and is configured so that the contact portion 32 of the lever 3 contacts the contact surface 62 in case of a vehicle collision. Accordingly, the contact portion 32 and the contact surface 62 are located at the same position in the vertical direction.

Operation in Case of Vehicle Collision

Next, an example of operation of the brake pedal device 100 according to the present embodiment in case of a vehicle collision will be described with reference to FIGS. 5 to 7. The dash panel 150 (see FIG. 1) is not shown in FIGS. 5 and 6.

When the dash panel 150 is moved toward the rear of the vehicle (in the X2 direction) with respect to the instrument panel reinforcement 151 in case of a vehicle collision, the lever bracket 4 and the pedal bracket 2 are moved toward the rear of the vehicle with respect to the guide member 6. Accordingly, as shown in FIG. 5, the contact portion 32 of the lever 3 contacts the contact surface 62 of the guide member 6 and the rear end 232 of the guided portion 23 of the pedal bracket 2 contacts the tilted surface 61a of the groove 61 of the guide member 6.

Figure 5:
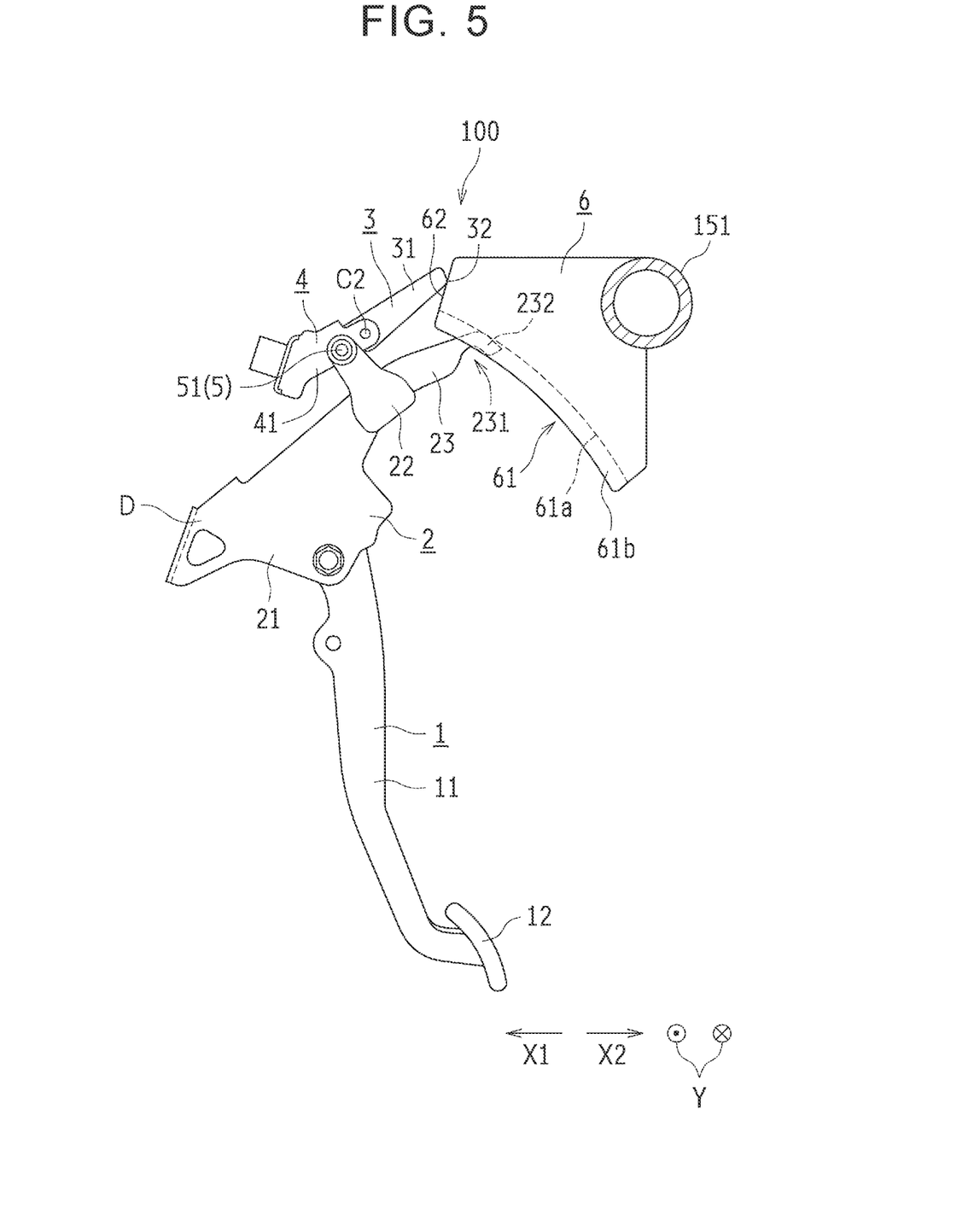
FIG. 5 is a side view of the brake pedal device of FIG. 1 with both the guided portion and a lever contacting a guide member in case of a vehicle collision.

When the contact portion 32 of the lever 3 contacts the contact surface 62 of the guide member 6, the lever 3 is pivoted counterclockwise in FIG. 5 about the pivot center C2 against the biasing force of the biasing member. The pushing portion 33 (see FIG. 2) of the lever 3 thus contacts the collar 53 (see FIG. 2), and the lever 3 thus pushes down the bolt 51. When the bolt 51 is removed from the cutout portions 41b of the lever bracket 4 as shown in FIG. 6, the lever bracket 4 and the pedal bracket 2 fastened together by the fastening member 5 are unfastened from each other. That is, as the lever 3 pushes down the fastening member 5 and the side plates 22, the pedal bracket 2 is separated from the lever bracket 4.

When the rear end 232 of the guided portion 23 of the pedal bracket 2 contacts the tilted surface 61a of the groove 61 of the guide member 6, the rear end 232 of the guided portion 23 slides along the tilted surface 61a. That is, the rear end 232 of the guided portion 23 is guided downward by the tilted surface 61a of the guide member 6.

Figure 6:
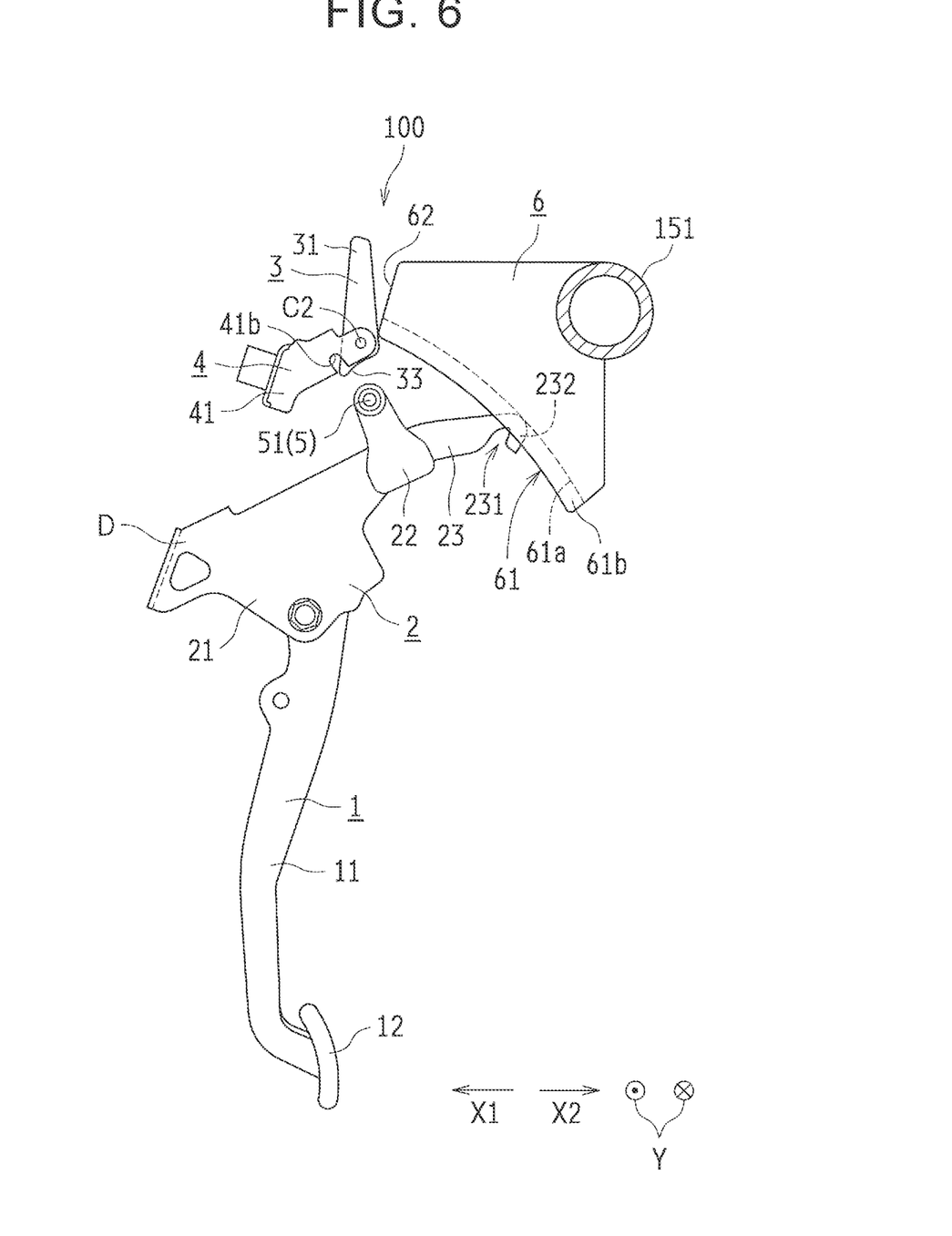
FIG. 6 is a side view of the brake pedal device of FIG. 5 with a pedal bracket being separated from a lever bracket in case of a vehicle collision.
Figure 7:
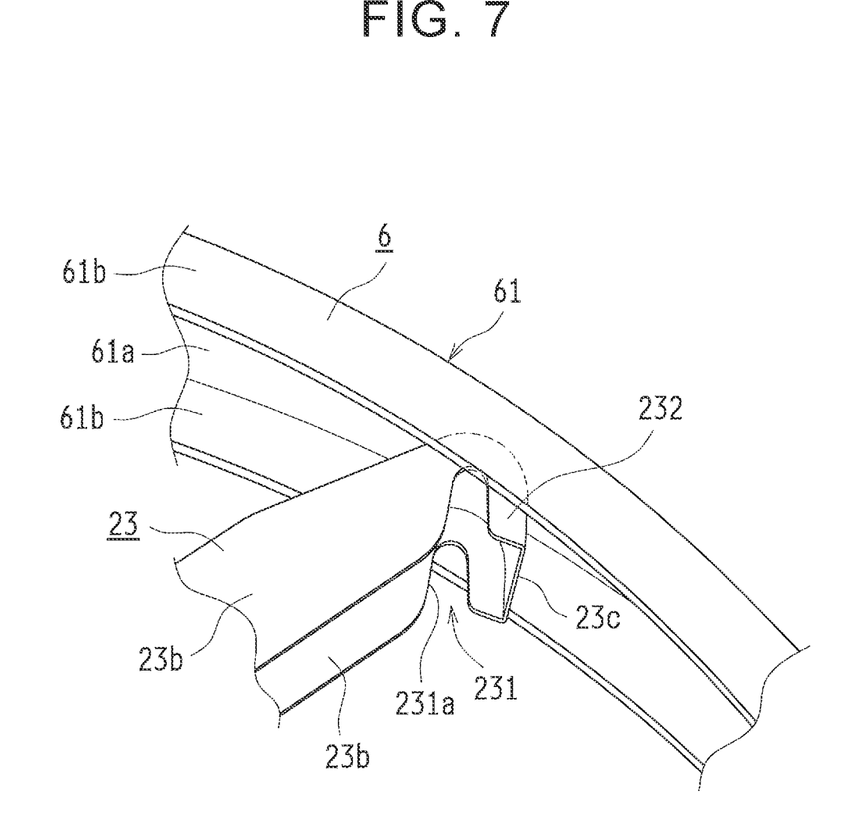
FIG. 7 is an enlarged perspective view of a groove of the guide member and the guided portion of the brake pedal device of FIG. 6.

The pedal bracket 2 is therefore pivoted and deformed clockwise in FIG. 6 about the center of deformation D. As the pedal bracket 2 is deformed in this manner, the brake pedal 1 is relatively moved toward the front of the vehicle (the X1 direction). That is, the brake pedal 1 is restrained from moving toward the rear of the vehicle in case of a vehicle collision.

When the load on the guided portion 23 increases while the rear end 232 of the guided portion 23 is being moved along the groove 61 of the guide member 6, the guided portion 23 is deformed from the brittle portion 231. For example, as shown in FIG. 7, the guided portion 23 is bent at the brittle portion 231 such that the cutout portions 231a are narrowed.

Effects

As described above, in the present embodiment, the guided portion 23 has the brittle portion 231. Accordingly, when the guided portion 23 is guided by the tilted surface 61a in case of a vehicle collision, the brittle portion 231 is deformed before an excessive load is applied to the contact portion between the guided portion 23 and the tilted surface 61a. The guided portion 23 is thus restrained from biting into the tilted surface 61a. Since the guided portion 23 is restrained from being caught by the tilted surface 61a in case of a vehicle collision, the guided portion 23 is appropriately guided along the tilted surface 61a. The brake pedal 1 is thus appropriately restrained from moving toward the rear of the vehicle (in the X2 direction) in case of a vehicle collision.

In the present embodiment, the cutout portions 231a are formed as the brittle portion 231. This configuration facilitates downward deformation of the rear end 232 of the guided portion 23. Accordingly, when the load on the guided portion 23 in contact with the tilted surface 61a increases in case of a vehicle collision, the guided portion 23 is deformed such that the rear end 232 is moved downward.

In the present embodiment, the recesses 231b are formed as the brittle portion 231. This configuration facilitates deformation of the rear end 232 of the guided portion 23 in the lateral direction of the vehicle. Accordingly, when the pedal bracket 2 is moved in the lateral direction of the vehicle with respect to the guide member 6 in case of a vehicle collision and a load in the lateral direction of the vehicle is applied to the guided portion 23 with the rear end 232 fitted in the groove 61, the guided portion 23 is bent at the brittle portion 231 in the lateral direction of the vehicle. Accordingly, even when the pedal bracket 2 is moved in the lateral direction of the vehicle with respect to the guide member 6 in case of a vehicle collision, the guided portion 23 is appropriately guided by the guide member 6.

In the present embodiment, the through hole 231c is formed as the brittle portion 231. This configuration further facilitates deformation of the brittle portion 231.

In the present embodiment, the side walls 61b are formed along both ends of the tilted surface 61a in the lateral direction of the vehicle. This configuration restrains the rear end 232 of the guided portion 23 from being displaced in the lateral direction of the vehicle with respect to the tilted surface 61a.

In the present embodiment, the lever bracket 4 is attached to the dash panel 150, and the lever 3 is pivotably provided in the lever bracket 4. The fastening member 5 fastens the lever bracket 4 and the pedal bracket 2 together, and the lever 3 unfastens the lever bracket 4 and the pedal bracket 2 from each other in case of a vehicle collision. This configuration simplifies assembly as the pedal bracket 2 and the lever bracket 4 are not fixed to the guide member 6.

Other Embodiments

The embodiment disclosed herein is illustrative in all respects and should not be construed as restrictive. The technical scope of the disclosure should not be interpreted only on the basis of the above embodiment but is defined based on description of the scope of claims. All modifications that are made without departing from the scope of the claims fall within the technical scope of the disclosure.

For example, the above embodiment is described with respect to an example in which the disclosure is applied to the brake pedal device 100 for vehicles. However, the disclosure is not limited to this, and the disclosure may be applied to accelerator pedal devices or clutch pedal devices for vehicles.

The above embodiment is described with respect to an example in which the guided portion 23 includes the main surface portion 23a, the side surface portions 23b, and the rear end face 23c. However, the disclosure is not limited to this, and the guided portion may have any shape.

The above embodiment is described with respect to an example in which the cutout portions 231a, the recesses 231b, and the through hole 231c are formed as the brittle portion 231. However, the disclosure is not limited to this, and one or two of the cutout portion, the recess, and the through hole may be formed as the brittle portion. Alternatively, the brittle portion may be formed by a portion other than the cutout portion, the recess, and the through hole.

The above embodiment is described with respect to an example in which the side walls 61b are formed along the ends of the tilted surface 61a in the lateral direction of the vehicle. However, the disclosure is not limited to this, and the side walls may not be formed along the ends of the tilted surface in the lateral direction of the vehicle.

The above embodiment is described with respect to an example in which the brake pedal device 100 includes the lever 3 and the lever bracket 4. However, the disclosure is not limited to this, and the brake pedal device need not necessarily include the lever and the lever bracket.

The above embodiment is described with respect to an example in which the pedal bracket 2 has the insertion holes 22a through which the bolt 51 is inserted and the lever bracket 4 has the cutout portions 41b in which the bolt 51 is placed. However, the disclosure is not limited to this, and the lever bracket may have the insertion holes through which the bolt is inserted and the pedal bracket may have the cutout portions in which the bolt is placed.

The disclosure is applicable to vehicle pedal devices including a pedal that is operated by a driver, a pedal bracket that supports the pedal so that the pedal is pivotable, and a guide member that guides deformation of the pedal bracket in case of a vehicle collision.

What is claimed is:
1. A vehicle pedal device, comprising:
a pedal;
a pedal bracket that supports the pedal such that the pedal pivots, the pedal bracket having a first end and an opposite second end; and
a guide member that guides deformation of the pedal bracket when a load is applied from a front of a vehicle, wherein:
the guide member is attached to an instrument panel reinforcement;

the guide member has a tilted surface tilted downward toward a rear of the vehicle;

the first end of the pedal bracket is attached to a dash panel;

the second end of the pedal bracket has a guided portion that is configured to be guided by the tilted surface when the load is applied from the front of the vehicle;

the guided portion has a cutout portion;

the guided portion comprises a main surface and two side surfaces extending downward, as viewed in a lateral direction of the vehicle, from opposite ends of the main surface; and edges of the two side surfaces opposite the main surface are recessed inwardly at the second end of the pedal bracket in a main surface side direction by the cutout portion as viewed in the lateral direction of the vehicle.

2. The vehicle pedal device according to claim 1, wherein the guided portion comprises:

a rear end face extending downward from a rear end of the main surface in a longitudinal direction of the vehicle.

3. The vehicle pedal device according to claim 1, wherein the main surface tapers inwards in the cutout portion.

4. The vehicle pedal device according to claim 1, wherein the cutout portion includes a through hole formed in the main surface.

5. The vehicle pedal device according to claim 1, wherein the guide member has a side wall formed along an end of the tilted surface in the lateral direction of the vehicle.

6. The vehicle pedal device according to claim 1, further comprising:

a lever bracket attached to the dash panel;

a lever provided in the lever bracket such that the lever pivots; and a fastening member that fastens the lever bracket and the pedal bracket together, wherein the lever is configured so that, when the load is applied from the front of the vehicle, the lever contacts the guide member and is pivoted to unfasten the lever bracket and the pedal bracket fastened together by the fastening member from each other.

7. The vehicle pedal device according to claim 1, wherein the pedal bracket is held apart from the guide member.

* * * * *